(12) United States Patent
Takata

(10) Patent No.: US 7,868,967 B2
(45) Date of Patent: Jan. 11, 2011

(54) LIGHT SOURCE DEVICE, AND DISPLAY DEVICE AND TELEVISION RECEIVER THEREWITH

(75) Inventor: Yoshiki Takata, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 242 days.

(21) Appl. No.: 12/066,443

(22) PCT Filed: May 31, 2006

(86) PCT No.: PCT/JP2006/310925
§ 371 (c)(1),
(2), (4) Date: Mar. 11, 2008

(87) PCT Pub. No.: WO2007/049373
PCT Pub. Date: May 3, 2007

(65) Prior Publication Data
US 2009/0102985 A1    Apr. 23, 2009

(30) Foreign Application Priority Data
Oct. 27, 2005    (JP) .............................. 2005-312963

(51) Int. Cl.
*G02F 1/1333* (2006.01)
(52) U.S. Cl. ........................................................ 349/58
(58) Field of Classification Search ................ None
See application file for complete search history.

(56) References Cited
U.S. PATENT DOCUMENTS
6,885,411 B2 * 4/2005 Ogawa et al. .................. 349/58

FOREIGN PATENT DOCUMENTS

| JP | 06-130384 A | 5/1994 |
|----|-------------|--------|
| JP | 08-029785 A | 2/1996 |
| JP | 08-320489 A | 12/1996 |
| JP | 09-316221 A | 12/1997 |
| JP | 2001-067008 A | 3/2001 |
| JP | 3098297 U | 2/2004 |
| JP | 2004-253354 A | 9/2004 |
| JP | 2004-311353 A | 11/2004 |

OTHER PUBLICATIONS

Official communication issued in counterpart International Application No. PCT/JP2006/310925, mailed on Aug. 29, 2006.

* cited by examiner

*Primary Examiner*—Sung H Pak
(74) *Attorney, Agent, or Firm*—Keating & Bennett, LLP

(57) ABSTRACT

A light source device includes a shade that is capable of reflecting light from both of its front and back surfaces and is wider than a hot-cathode tube. The shade is disposed between the hot-cathode tube and the optical member so as to maintain a certain distance from the optical member. Light radiated from the hot-cathode tube to the optical member side is reflected by the shade, and thereby prevented from directly illuminating the optical member. Further, the shade functions as a pseudo light source wider than the hot-cathode tube due to the reflectivity of the optical member side surface of the shade, and thereby formation of lamp images can be suppressed.

20 Claims, 11 Drawing Sheets

LIGHT SOURCE DEVICE, AND DISPLAY DEVICE AND TELEVISION RECEIVER THEREWITH

BACKGROUND OF THE INVENTION

1. Field of the Invention

The present invention relates to a light source device, and a display device and a television receiver therewith.

2. Description of the Related Art

A light source device used for a liquid-crystal display device or an illuminated sign, as described in JP-A-2001-67008, is conventionally known, which includes light sources, a translucent optical member opposite to the light sources, and a reflector plate disposed on the opposite side of the light sources from the optical member so as to reflect light to the optical member side.

In this kind of the light source device, if light from the light sources is directly radiated to the optical member, the close-to-light-source areas of the optical member are very brightly illuminated, while the areas distant from the light sources are poorly illuminated. This could result in forming so-called lamp images on the optical member. If the lamp images are thus formed, the brightness of the screen of the liquid-crystal display device lacks uniformity, which has undesirable effects on visual quality.

For this reason, in the light source device according to JP-A-2001-67008, a thin film having patterns formed of a light-reflective material is applied to the optical-member-side surface of the light sources. Thereby, light radiated from the light sources to the optical member side is partly reflected by the patterns formed on the thin film, while light transmitted through the unpatterned areas directly illuminates the optical member. Consequently, the amount of light radiated from the light sources directly to the optical member can be decreased. The light reflected by the patterns is, together with light radiated from the light sources to the opposite side of the optical member, reflected by the reflector plate, so as to indirectly illuminate the optical member. Thus, the amount of light directly radiated to the optical member is decreased, while the amount of light reflected by the reflector plate and indirectly illuminating the optical member is increased. Thereby, formation of lamp images can be suppressed.

In recent years, as for the above light source device used for a liquid-crystal display device, enhancement of luminescence per light source and thereby reduction in the total number of light sources have been required for reduction in cost and the number of components. Specifically, a hot-cathode tube has a luminescence intensity approximately several times higher than that of a cold-cathode tube conventionally used for a liquid-crystal display device, or more. Thereby, the total number of the light sources can be reduced almost to a third or a sixth, compared to the case in which cold-cathode tubes are used.

In the light source device according to the above-described construction, light radiated from the light sources to the front side and transmitted through the unpatterned areas directly illuminates the optical member. Therefore, in the case that the above-described hot-cathode tubes are used as light sources, the unpatterned areas can function as high-intensity light sources, and thereby lamp images having shapes corresponding to the patterns formed on the thin film may be formed on the optical member.

SUMMARY OF THE INVENTION

In order to overcome the problems described above, preferred embodiments of the present invention provide a readily-constructed light source device capable of suppressing formation of lamp images, and provide a display device and a television receiver therewith.

A light source device according to a preferred embodiment of the present invention includes a light source, an optical member disposed opposite to the light source and capable of transmitting light, a back-side reflective portion disposed on the opposite side of the light source from the optical member and capable of reflecting light to the optical member side, a shade that is wider than the light source and capable of reflecting light from both of its front and back surfaces. The shade is disposed between the light source and the optical member so as to maintain a certain distance from the optical member. Also preferably included is a lateral-side reflective portion, which is disposed on a lateral side of the shade and capable of reflecting light from the light source or the back-side reflective portion to the optical member side surface of the shade.

According to this construction, the shade is preferably disposed between the light source and the optical member. Therefore, light radiated from the light source to the optical member side is reflected by the light-source-side surface of the shade, so as to illuminate the back-side reflective portion side together with light radiated from the light source to the opposite side of the optical member. Then, the light is reflected to the optical member side by the back-side reflective portion, and thereafter reflected by the lateral-side reflective portion. Thereby, the light can reach the optical member side around the shade so as to illuminate the optical member side surface of the shade. The shade is capable of reflecting light by both of its front and back surfaces. Therefore, the optical member side surface of the shade reflects the light shone thereon so as to be dimly illuminated, and thereby functions as a pseudo light source.

Preferably, the present invention is embodied as follows.

(1) The shade is preferably formed as a curved plate, so that its concavity is on the light source side while its convexity is on the optical member side. Thereby, the light reflected by the optical member side surface of the shade can be diffused while traveling to the optical member side. This is effective for elimination of lamp images.

Further, in the case that a plurality of light sources are arranged, for example, according to the above-described preferred shape of the shade, light from neighboring light sources can illuminate the optical member side surface of the shade. Consequently, the shade can illuminate the optical member by reflecting the light radiated from the plurality of neighboring light sources, and thereby the brightness can be uniformly distributed over the light source device.

(2) The shade preferably has translucency. According to this construction, light radiated from the light source to the optical member side is partially transmitted through the shade, and exits from the optical member side of the shade. Consequently, the optical member side of the shade can be prevented from being darkened due to blocking of light from the light source, even in the case that the reflectivity of the optical member side surface of the shade is low or in the case that light radiation to the optical member side of the shade is ineffective due to the shape or the mounting location of the shade, for example. Thereby, the brightness can be uniformly distributed over the light source device.

(3) The shade preferably is capable of diffuse transmission. The diffuse transmission means that light when transmitted is diffused in various directions macroscopically irrespective of the law of refraction. Thereby, the shade as a whole functions as a pseudo light source, and the brightness can be further uniformly distributed over the optical member.

(4) The shade is preferably disposed above the light source, and therefore light from the light source may directly illuminate the optical member by taking an oblique direction. This could result in forming lamp images. In view of this, the shade is preferably constructed so that both of its front and back surfaces can scatter and reflect the light shone thereon. According to this construction, the optical member is diagonally illuminated by both of light from the light source and light scattered and reflected by the shade. Consequently, the brightness of light radiated directly from the light source and light reflected by the shade is equalized. Thereby, formation of lamp images due to light diagonally radiated to the optical member can be suppressed.

(5) The shade preferably is spaced at a distance from the light source. According to this construction, light radiated from the light source attenuates while traveling from the light source to the shade, and therefore the shade lights with a lower intensity, compared to the construction in which the shade is disposed in proximity to the light source. Thereby, formation of lamp images can be further suppressed.

(6) The shade preferably is white in color. Thereby, light reflected by the shade can be prevented from being colored, and therefore the light source device according to a preferred embodiment of the present invention can be suitably used as a backlight of a liquid-crystal display device, for example.

(7) An auxiliary reflective portion for reflecting light from the light source to the lateral sides of the light source preferably is provided on the back-side reflective portion. According to this construction, light radiated from the light source to the back-side reflective portion side is reflected to the lateral sides of the light source by the auxiliary reflective portion, and thereafter scattered and reflected by the shade or the lateral-side reflective portion so as to illuminate the optical member. Thereby, lamp images can be further minimized.

(8) The light source preferably includes a plurality of elongated bar-like light sources arranged sideways. Further, the shade preferably has translucency, and one of its edges substantially parallel to the longitudinal direction of the light source abuts on the back-side reflective portion while a gap is formed between the other edge and the back-side reflective portion. According to this construction, light having entered into the light source side of the shade through the gap formed between the edge of the shade and the back-side reflective portion is partially transmitted through the shade so that the optical member side of the shade lights. Thereby, the optical member side of the shade can be prevented from being darkened due to blocking of light from the light source, and the brightness can be uniformly distributed over the light source device.

According to various preferred embodiments of the present invention, the shade prevents intense light of the light source from illuminating the optical member. Further, the optical member side of the shade functions as a pseudo light source due to its reflectivity. Thereby, formation of lamp images can be suppressed.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
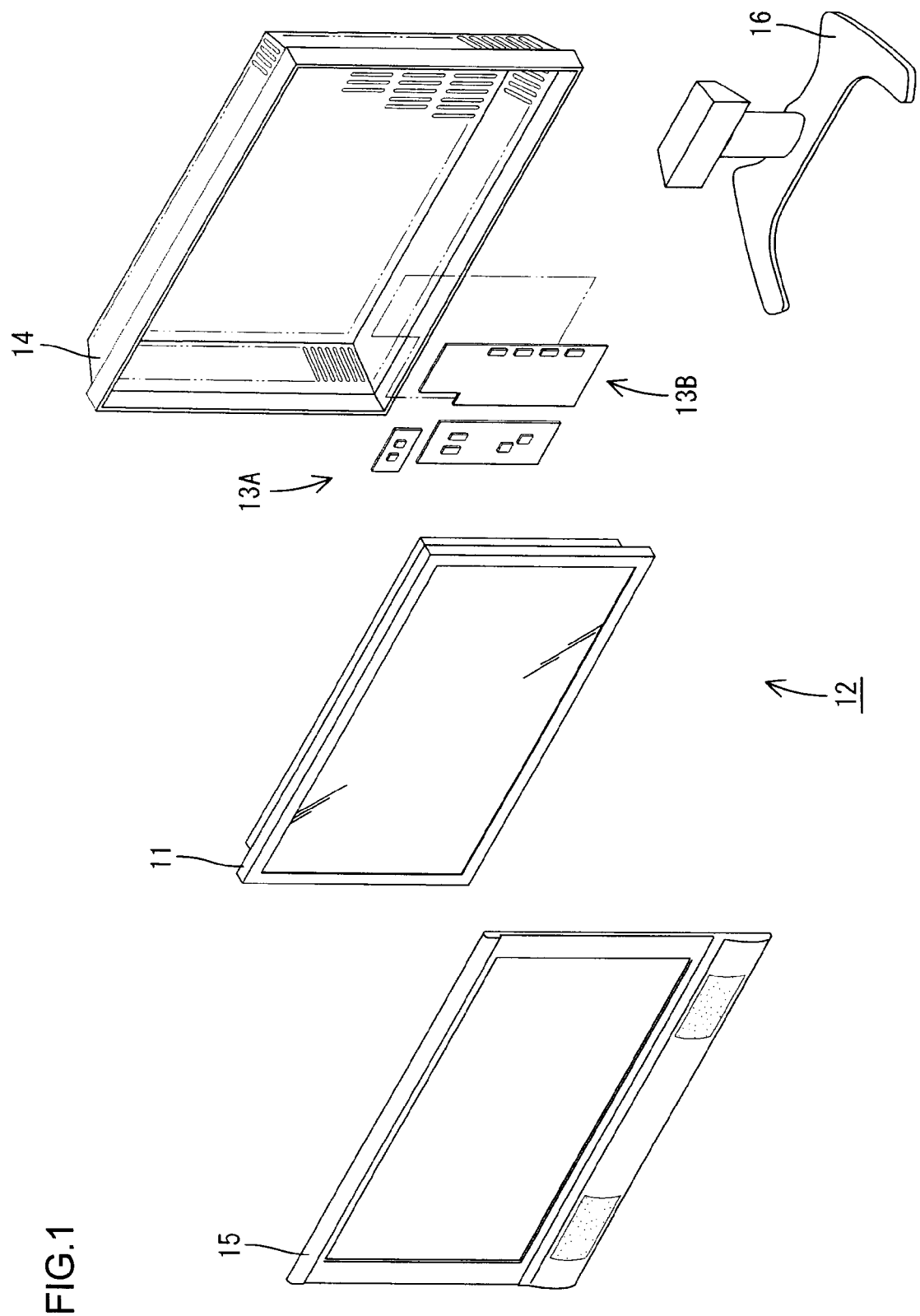
FIG. 1 is an exploded perspective view of a television receiver according to a first preferred embodiment of the present invention.
Figure 2:
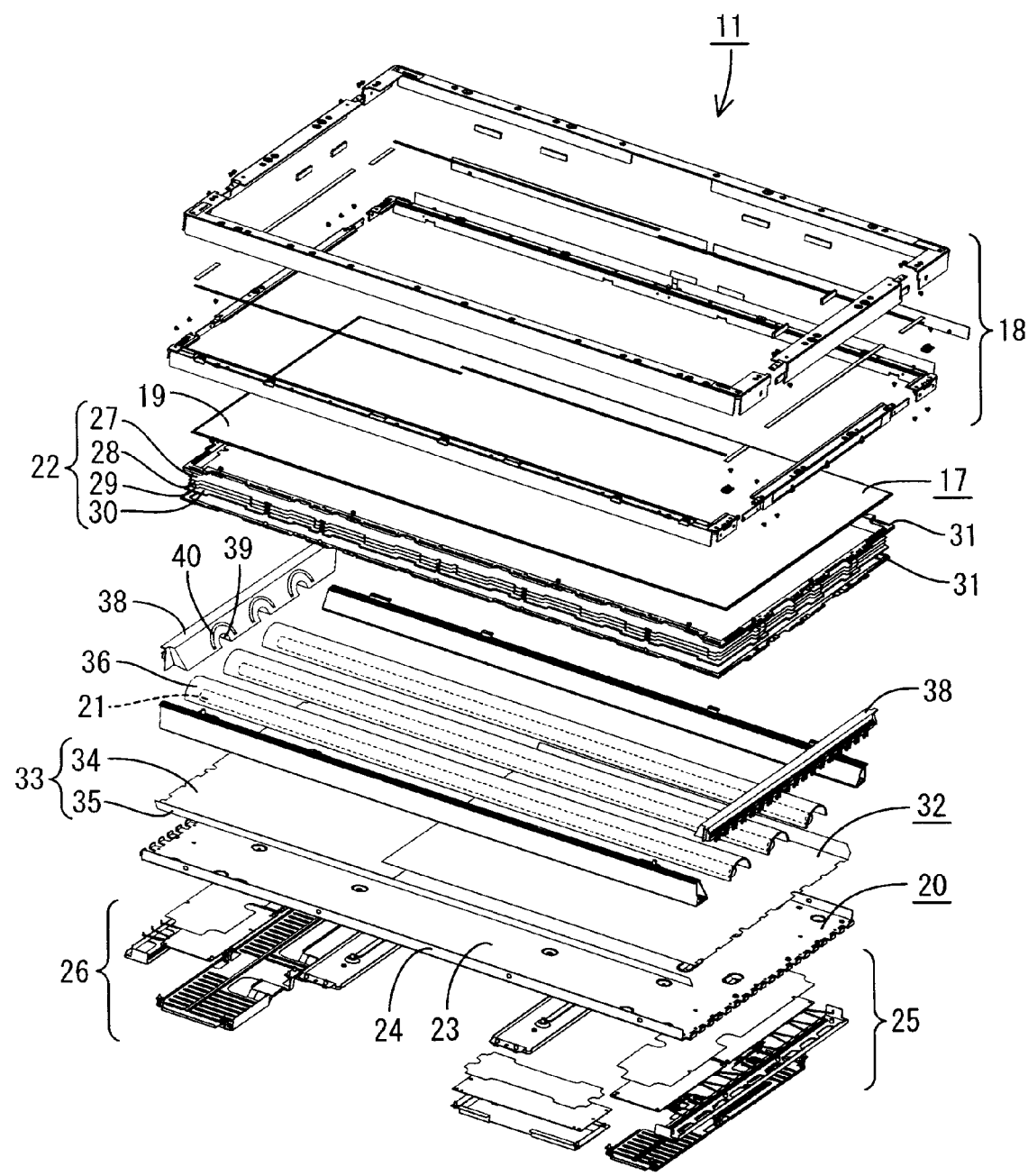
FIG. 2 is an exploded perspective view of a liquid-crystal display shown in FIG. 1.

A first preferred embodiment according to the present invention will be explained with reference to FIGS. 1 through 5. In the first preferred embodiment, a television receiver 12 preferably includes a liquid-crystal display 11 (corresponding to a display device of preferred embodiments of the present invention) to which a light source device 10 according to preferred embodiments of the present invention is applied. As shown in FIG. 1, the television receiver 12 includes the liquid-crystal display 11, a tuner circuit (corresponding to a television signal receiver of preferred embodiments of the present invention) 13A, a display driving circuit 13B for driving the liquid-crystal display 11 based on signals from the tuner circuit 13A, a housing case 14 therefor, a cabinet 15 attached to the front surface of the liquid-crystal display 11, and a stand 16 for supporting the housing case 14 from below. As shown in FIG. 2, the liquid-crystal display 11 includes a liquid-crystal panel 17 and the light source device 10, which are integrated using a bezel 18. Hereinafter, the upper side of FIG. 2 is referred to as the front side, while the lower side of FIG. 2 is referred to as the back side.

The liquid-crystal panel 17, not shown in detail, preferably has a well-known construction, in which a pair of substantially rectangular glass substrates 19, having switching elements (e.g., TFTs) not shown, picture electrodes not shown and the like arranged in a matrix thereon for forming pixels, are bonded to each other with a predetermined gap, and liquid crystal is filled between the glass substrates 19. A polarizing plate (not shown), which has substantially the same size as the glass substrates 19, is placed on the outer surface (i.e., the surface on the opposite side of the liquid-crystal layer) of each glass substrate.

The light source device 10 is mounted to the back side (lower side in FIG. 2) of the liquid-crystal panel 17. The light source device 10 includes a casing 20 having an opening on its front side (upper side in FIG. 2), and a plurality (e.g., three in the present preferred embodiment) of hot-cathode tubes 21 (corresponding to a light source of preferred embodiments of the present invention) contained in the casing 20, and an optical member 22 that is capable of transmitting light and mounted to the casing 20 so as to cover the opening. The light source device 10 preferably is a direct-light type, in which the light sources are disposed on the back side of the liquid-crystal panel 17.

The casing 20 includes a substantially rectangular-shaped bottom plate 23 having substantially the same size as the liquid-crystal panel 17, and side walls 24 raised from the four sides of the bottom plate 23 toward the front side. Thereby, the casing as a whole preferably has a shallow dish shape having the opening on its front side. Further, an inverter unit 25 for controlling the lighting-up of the hot-cathode tubes 21, and an external circuit unit 26 are mounted to the back side of the casing 20.

The optical member 22 is mounted to the opening of the casing 20, in order to diffuse light from the hot-cathode tubes 21 so that uniform flat light illuminates the liquid-crystal panel 17. The optical member 22 includes a diffusing sheet 27, a lens sheet 28, an optical sheet 29 and a diffuser plate 30, which are stacked in this order from top down. Each of the sheets 27, 28, 29, 30 is capable of transmitting light, and preferably has a substantially rectangular shape of substantially the same size as the liquid-crystal panel 17. Further, substantially rectangular-shaped frames 31 for mounting the present optical member 22 to the casing 20 or to the bezel 18 are provided on the respective front and back sides of the optical member 22.

The casing 20 is lined with a reflective portion 32 for reflecting light from the hot-cathode tubes 21. The reflective portion 32 preferably is formed of white sheets made of synthetic resin, i.e., two split sheets 33 of substantially the same shape, which are arranged in staggered form. That is, a back-side reflective portion 34 that fits the bottom plate 23 of the casing 20 is divided into two in its longitudinal middle. Each split sheet 33 includes a half thereof, and a lateral-side reflective portion 35 which is bonded thereto as a long-side portion thereof and fits the side wall 24 formed on the long side of the casing 20. The back-side reflective portion 34 reflects light from the hot-cathode tubes 21 to the optical member 22 side, while the lateral-side reflective portions 35 reflect light from the hot-cathode tubes 21 and light reflected by the back-side reflective portion 34 to the optical member 22 side surfaces of shades 36 described below. The reflectivity of the back-side reflective portion 34 and the lateral-side reflective portion 35 is preferably approximately 99%, for example.

In the casing 20, the plurality of hot-cathode tubes 21 as light sources are arranged substantially evenly spaced apart on the front side (optical member 22 side) of the reflective portion 32. The hot-cathode tubes 21, each of which is formed of a tubular body 37 (FIG. 3) having a bar-like shape elongated along the long side of the casing 20, are arranged along the short side of the casing 20. Further, on the front side of the reflective portion 32 in the casing 20, a pair of lamp holders 38 elongated along the short sides of the casing 20 are disposed along the short sides of the casing 20. On the surface of each lamp holder 38 opposite to the back-side reflective portion 34, light-source receiving grooves 39, each of which has substantially a semicircular cross section and is formed along the long side of the casing 20, are provided corresponding to the hot-cathode tubes 21 and for holding the hot-cathode tubes 21 as light sources. Both ends of the hot-cathode tubes 21 are held in the light-source receiving grooves 39 of the lamp holders 38, so as to be lumped together and covered by the lamp holders 38. Each end of the hot-cathode tubes 21, not shown in detail, is connected to a connector portion (not shown) formed in the lamp holder 38. Further, the tubular body 37 of each hot-cathode tube 21 is held by a lamp clip not shown.

Each hot-cathode tube 21 preferably has a luminescence intensity approximately several times higher than that of a cold-cathode tube conventionally used as a light source for a light source device 10 of a liquid-crystal display 11, or more. Therefore, the total number of light sources can be reduced almost to a third or a sixth, compared to the case in which cold-cathode tubes are used as light sources. Consequently, reduction in the number of components can be achieved. Further, as a result of reduction in the number of light sources, the distance (i.e., lamp pitch) between the hot-cathode tubes 21 can be set to be almost three times or six times longer, compared to the case in which cold-cathode tubes are used as light sources.

Between the hot-cathode tubes 21 and the optical member 22, a plurality (e.g., three in the present preferred embodiment) of shades 36, each of which corresponds to one of the hot-cathode tubes 21 and is wider than the hot-cathode tube 21, are disposed at a distance from the optical member 22 and also at a distance from the hot-cathode tubes 21. Each shade 36 is preferably formed of a sheet made of synthetic resin, which preferably has a reed shape elongated along the longitudinal direction of the hot-cathode tube 21. Both of the front and back surfaces of the shades 36 can reflect light, and also can transmit light. Each of the shades 36 preferably has a curved shape, so that the cross section of the shade 36 viewed from its longitudinal direction forms substantially a semicircular shape. Its concavity is on the hot-cathode tube 21 side, while its convexity is on the optical member 22 side.

Figure 3:
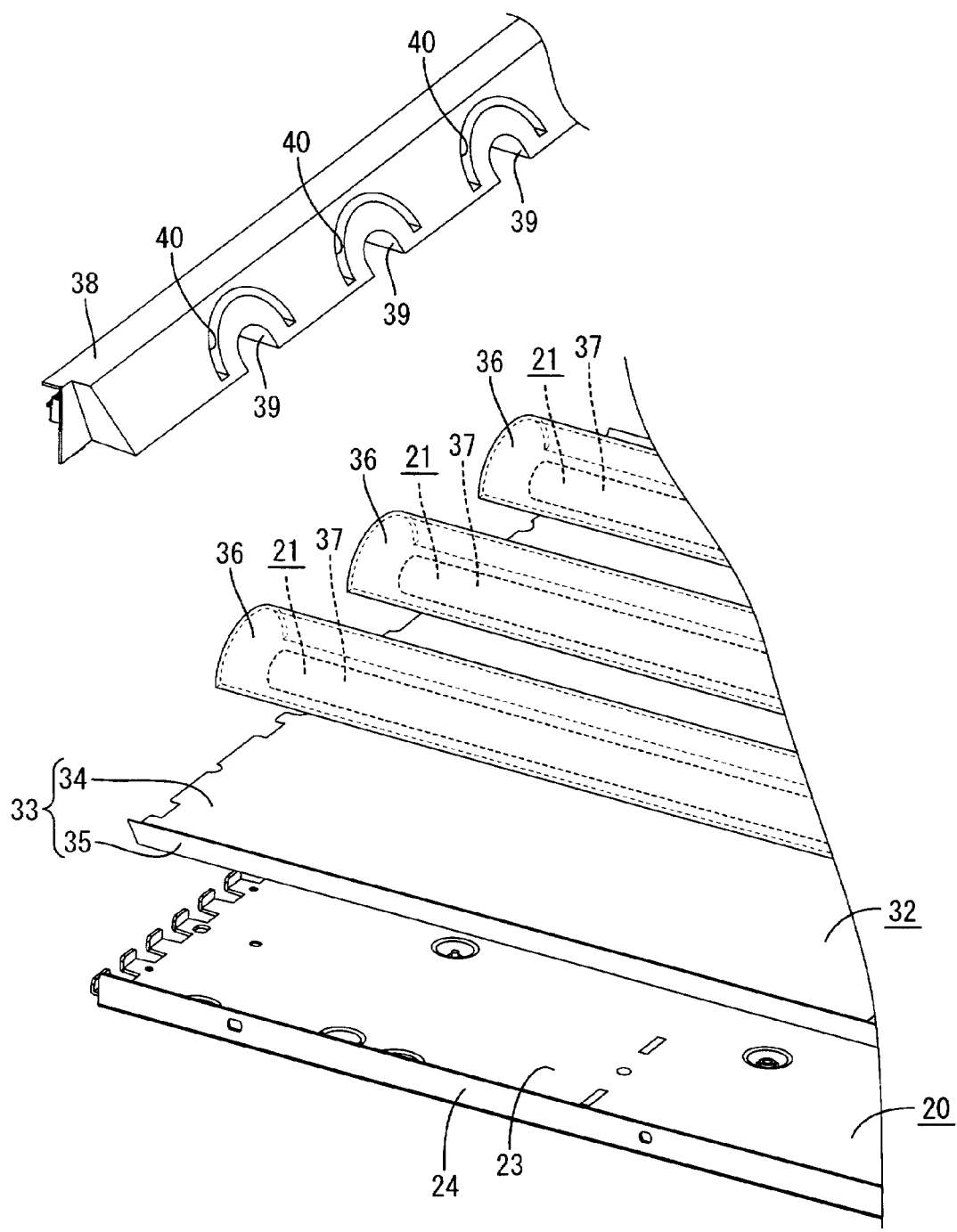
FIG. 3 is a partially-enlarged exploded perspective view of an optical member.

In the lamp holders 38, as shown in FIG. 3, shade mounting grooves 40, each of which is positioned on the front side of the light-source receiving groove 39 and forms substantially a semicircular arc shape so as to have its concavity on the back side (the hot-cathode tube 21 side), are formed for mounting the shades 36. Each longitudinal end of the shades 36 is inserted into the shade mounting groove 40, and thereby the shades 36 are mounted to the lamp holders 38. Each shade 36 can be formed into a predetermined shape by bending involving formation of creases or shape memory.

Figure 4:
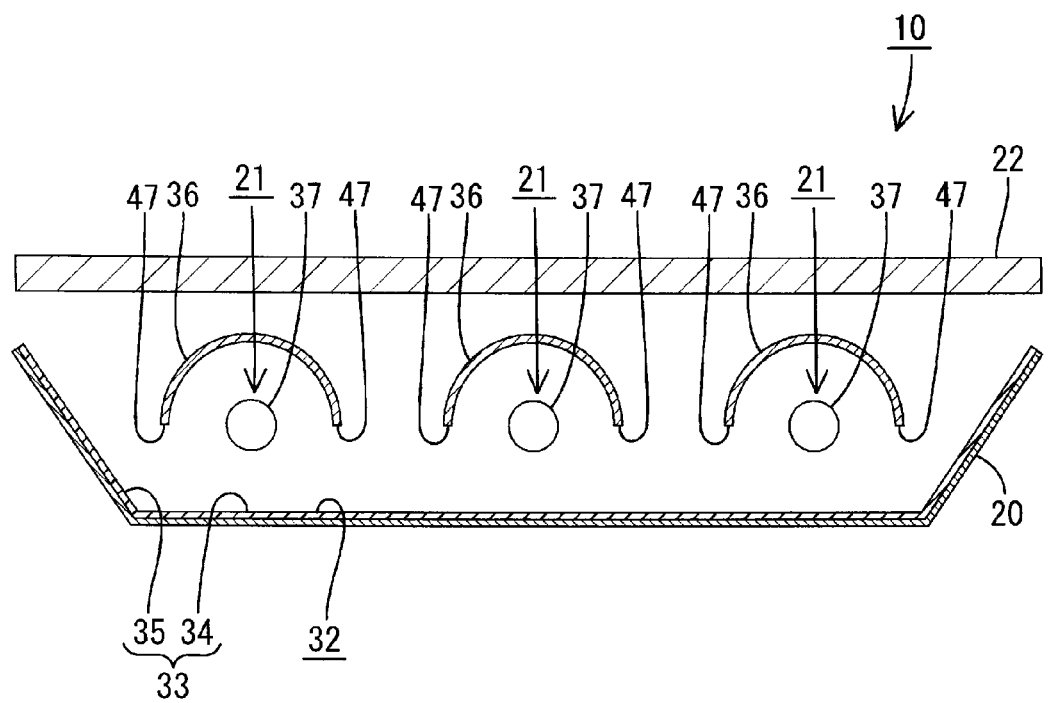
FIG. 4 is a schematic sectional view of the general construction of the optical member.

As shown in FIG. 4, each back-side edge 47 of the shades 36 is positioned between the back end and front end of the hot-cathode tube 21. Further, each shade 36 preferably has a width larger than the diameter of the tubular body 37 of the hot-cathode tube 21.

Figure 5:
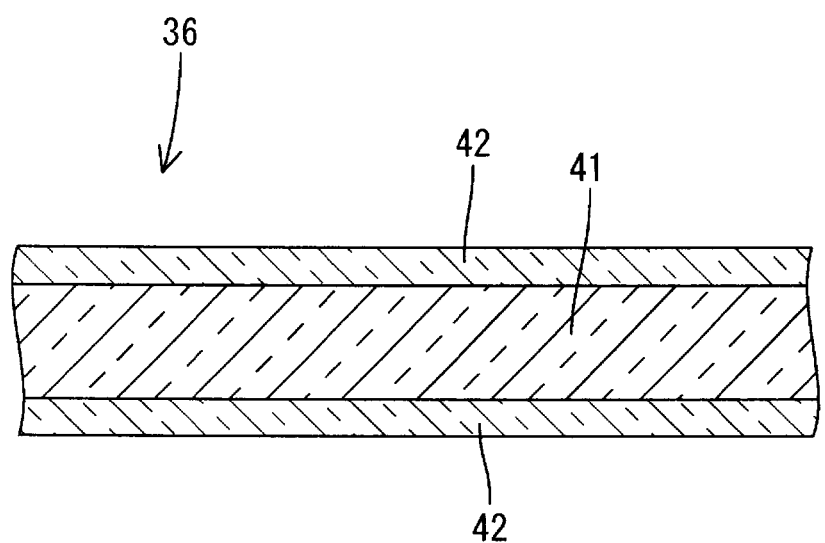
FIG. 5 is a schematic sectional view of the construction of a shade.

Each shade 36 is preferably formed of a white sheet, in which reflective layers 42 capable of light reflection are formed on the front and back sides of a base film 41 made of synthetic resin as shown in FIG. 5. The reflective layers 42 can scatter and reflect light shone thereon.

According to the above construction, the shade 36 is disposed between each hot-cathode tube 21 and the optical member 22. Therefore, light radiated from the hot-cathode tube 21 to the optical member 22 side is reflected by the hot-cathode tube 21 side surface of the shade 36, so as to illuminate the back-side reflective portion 34 side together with light radiated from the hot-cathode tube 21 to the opposite side of the optical member 22. Then, the light is reflected to the optical member 22 side by the back-side reflective portion 34, and thereafter reflected by the lateral-side reflective portions 35. Thereby, the light can reach the optical member 22 side around the shade 37 so as to illuminate the shade 36. Both of the front and back surfaces of the shade 36 can reflect light. Therefore, the optical member 22 side surface of the shade 36 reflects the light shone thereon, so as to be dimly illuminated. In this way, the shade 36 prevents intense light of the hot-cathode tube 21 from illuminating the optical member 22. Further, the optical member 22 side of the shade 36 functions as a pseudo light source due to its reflectivity. Thereby, formation of lamp images can be suppressed.

The thickness of each shade 36 including the base film 41 and the reflective layers 42 is preferably set to be equal to or larger than about 100 μm, for example, because the shade 36 should have a strength to support its own weight when applied to a large liquid-crystal display 11 of 20 inches or larger, for example.

The base film 41 may be formed of any synthetic resin that can be shaped into a film. Polyolefin, Polyester, Polyester carbonate, Vinyl chloride or Polystyrene is preferable because of its superior extensibility. Polyester is particularly preferable, because it is superior in dimensional stability and flatness. Various additives such as antioxidant or antistat may be added to the base film 41 within a scope which does not vitiate the effects of the present invention.

Polyethylene terephthalate (PET), Polybutylene terephthalate (PBT), Polyethylene-p-oxybenzoate, Poly-1,4-cyclohexylenedimethylene terephthalate (PCHDMT), or Polyethylene-2,6-naphthalenedicarboxylate (PEN) can be used as Polyester. PET or PEN is particularly preferable because of its superior transparency.

As the reflective layers 42, synthetic resin layers including inorganic particles or empty spaces (voids), or including both of voids and inorganic particles can be used. The reflectivity of the reflective layers 42 is set by balancing with the reflectivity of the back-side reflective portion 34 and the lateral-side reflective portions 35, so that the brightness is uniformly distributed over the optical member 22. In the present preferred embodiment, the reflectivity of the reflective layers 42 is preferably set so that the overall reflectivity of the shade 36 is approximately 50%, for example. Preferably, the reflectivity of the reflective layers 42 is set to be higher if the lamp pitch of the hot-cathode tubes 21 is set to be longer. On the other hand, the reflectivity is preferably set to be lower if the lamp pitch of the hot-cathode tubes 21 is set to be shorter. Thus, the design can be appropriately changed.

Light having entered the reflective layer 42 is multiply refracted and reflected by the inorganic particles or voids included in the reflective layer 42, and thereafter exits the reflective layer 42. In this way, the reflective layer 42 can scatter and reflect the light. Thus, light should be multiply refracted and reflected by the inorganic particles and/or voids, and therefore preferably, the diameter of each inorganic particle and the inner diameter of each void included in the reflective layers 42 are set so as to be one order of magnitude larger than the wavelengths of visible light, i.e., to be equal to or larger than about 1 μm, for example. Further, according to the above construction of the reflective layers 42, light having entered the reflective layer 42 can exit through the opposite side of the entrance side after multiply refracted or reflected by the inorganic particles or voids. Thereby, the reflective layers 42 can provide translucency. According to the above construction, the shades 36 can provide diffuse transmittivity in the present preferred embodiment.

As an inorganic particle used for the reflective layer 42 including the inorganic particles, Silica beads, Aluminum oxide, Magnesium oxide, Titanium oxide or Barium sulfate can be used. Titanium oxide or Barium sulfate is preferable because it is transparent. The thickness of the reflective layer 42 including inorganic particles is preferably set to be within the range of about 1 μm to about 100 μm, for example. If the thickness of the reflective layer 42 is smaller than about 1 μm, the reflectivity of the reflective layer 42 is low. Therefore, the brightness of the shades 36 may be insufficient when it reflects light shone thereon. Further, the shades 36 may be colored due to reflectivity varying depending on the wavelengths in visible light range. The thickness of the reflective layer 42 exceeding about 100 μm is not preferable, because the shade 36 may be difficult to bend for shaping. The shade 36 can be formed by printing synthetic resin, as a binder to which inorganic particles are added, on one side or two sides of the base film 41, for example.

When the reflective layer 42 including voids is formed, synthetic resin is mixed with a thermal-decomposition-type blowing agent such as Azodicarbonamide, N,N')-Dinitrosopentamethylenetetramine, 4,4'-Oxybis (benzenesulfonylhydrazide), Diazoaminobenzene, Azo-di-isobutyronitrile, Sodium hydrogen carbonate or Ammonium carbonate, which is thermally decomposed so as to generate gas such as Nitrogen, Oxygen or Carbon dioxide gas. Then, the voids can be formed by decomposition of the blowing agent at the time of thermal melting. Preferably, the thickness of the reflective layer 42 including voids is set to be within the range of about 50 μm to about 1 mm, for example. A thickness smaller than approximately 50 μm is not preferable because it is insufficient in strength. Further, this could result in insufficient brightness of the shades 36 due to the resultant low reflectivity. A thickness exceeding about 1 mm is not preferable, because the shades 36 may be excessively bright due to the resultant high reflectivity.

When the reflective layer 42 including both of inorganic particles and voids is formed, Calcium carbonate, Aluminum oxide, Magnesium oxide, Barium sulfate or Silica beads can be used as inorganic particles. A preferable production method is provided, in which static charges are preliminarily injected into the interfaces of the particles and thereafter voids are efficiently formed by being stretched. However, a production method that uses the electrostatic casting method is particularly preferable, in which static charges can be injected at the time of melting. Preferably, the thickness of the reflective layer 42 including both of inorganic particles and voids is set to be within the range of about 50 μm to about 1 mm. The thickness smaller than about 50 μm is not preferable because it is insufficient in strength. Further, this could result in insufficient brightness of the shades 36 due to the resultant low reflectivity. The thickness exceeding about 1 mm is not preferable, because the shades 36 may be excessively bright due to the resultant high reflectivity.

The shades 36 can multiply reflect the incident light. The transmittivity of the shades 36 corresponds to the difference determined by subtracting its reflectivity from 100%. Preferably, the transmittivity is set to be within the range of about 10% to about 80%, for example. A transmittivity lower than about 10% is not preferable, because the optical member 22 side surfaces of the shades 36 may be dark. A transmittivity exceeding about 80% is not preferable, because lamp images may be formed due to a large amount of light transmitted to the optical member 22 side through the shades 36. Preferably, the reflectivity and transmittivity of the shades 36 are set as follows. If the lamp pitch of the hot-cathode tubes 21 is set to be longer, the transmittivity is set to be lower while the reflectivity is set to be higher. If the lamp pitch is set to be shorter, the transmittivity is set to be higher while the reflectivity is set to be lower. Thus, the design can be appropriately changed.

The shades 36 can be produced by printing or spraying synthetic resin, as binder to which inorganic particles are added, on the surface(s) of the base film 41. Alternatively, the production can be achieved by a method in which synthetic resin including voids and/or inorganic particles is printed as a layer on the surface(s) of the base film 41, or a synthetic resin film including voids and/or inorganic particles is bonded thereto.

Next, the operation and effect of the present preferred embodiment will be explained.

When the liquid-crystal display 11 is assembled, the reflective portion 32 is first placed on the front side of the bottom plate 23 of the casing 20, and the lamp clips not shown are mounted thereon from the front side of the reflective portion 32. Next, the hot-cathode tubes 21 are arranged in the casing 20, and the tubular bodies 37 of the hot-cathode tubes 21 are held by the lamp clips. The lamp holders 38 are fitted into the casing 20 so as to cover the respective ends of the hot-cathode tubes 21. The optical member 22, the frames 31, the inverter unit 25 and the external circuit unit 26 are fixed to the casing 20, and then assembling of the light source device 10 is completed. Lastly, the light source device 10 is mounted to the back side of the liquid-crystal panel 17, and fixed by the bezel 18. Then the liquid-crystal display 11 is completed.

In the liquid-crystal display 11, light from the hot-cathode tubes 21 provided in the light source device 10 enters the optical member 22, so as to be diffused by the optical member 22 and illuminate the liquid-crystal panel 17 from the back side thereof. Thereby, display on the liquid-crystal panel 17 is made visible.

Among light from the hot-cathode tubes 21, light radiated to the optical member 22 side illuminates the hot-cathode tube 21 side (back side) surfaces of the shades 36 disposed between the hot-cathode tubes 21 and the optical member 22. The reflective layers 42 are formed on the respective sides of each shade 36, and therefore the light radiated to the back side of the shade 36 is partially reflected by the reflective layer 42 on the back side of the shade 36. Thereby, intense light from the hot-cathode tubes 21 can be prevented from directly illuminating the optical member 22, and therefore formation of lamp images can be suppressed. Further, the reflective layer 42 can scatter and reflect the light shone thereon. Thereby, lamp images can be minimized. On the other hand, the rest of the light radiated to the back surface of the shade 36 is transmitted through the reflective layer 42 and the base film 41, so as to reach the reflective layer 42 formed on the optical member 22 side (front side) of the shade 36.

The light reflected by the reflective layer 42 formed on the back side of the shade 36 illuminates the back-side reflective portion 34, together with light radiated from the hot-cathode tubes 21 to the back-side reflective portion 34 side. The light shone on the back-side reflective portion 34 partially illuminates the optical member 22, while the rest thereof illuminates the lateral-side reflective portions 35.

The back-side edges 47 of each shade 36 are substantially aligned height-wise with the longitudinal symmetric axis of the hot-cathode tube 21. Therefore, light radiated from each hot-cathode tube 21 to the lateral sides can illuminate adjacent hot-cathode tubes 21. Thereby, the brightness can be uniformly distributed over the light source device 10. The light radiated from the hot-cathode tubes 21 to the lateral sides reaches the lateral-side reflective portions 35 so as to illuminate the lateral-side reflective portions 35.

The light illuminating the lateral-side reflective portions 35 is reflected by the lateral-side reflective portions 35. The shades 36 are positioned so as to keep a distance from the optical member 22, and therefore the light reflected by the lateral-side reflective portions 35 illuminates the optical member 22 side surfaces of the shades 36. The front surface of each shade 36 includes the reflective layer 42 formed thereon, and therefore reflects the light shone thereon so as to be dimly illuminated. Thus, the shades can function as pseudo light sources, and thereby illuminate the optical member 22. Each shade 36 preferably has a width larger than that of the tubular body 37 of the hot-cathode tube 21, and therefore the shade 36 can function as a pseudo light source having a larger width and a lower intensity than the hot-cathode tube 21. Thereby, lamp images can be further minimized. Moreover, each shade 36 has a curved shape so that its convexity is on the front side, and therefore the light reflected by the front surface of the shade 36 travels to the optical member 22 side while being diffused. Thereby, further mitigation of lamp images can be achieved. Further, the front surface of each shade 36 can be illuminated by light from the neighboring hot-cathode tubes 21. Therefore, the shade 36 reflects the light from the plurality of neighboring hot-cathode tubes 21, so as to illuminate the optical member 22. Thereby, the brightness can be uniformly distributed over the light source device 10.

In the present preferred embodiment, the shades 36 are preferably disposed above the hot-cathode tubes 21, and therefore light from each hot-cathode tube 21 may directly illuminate the optical member 22 by taking an oblique direction. This could result in forming lamp images. In view of this, according to the present preferred embodiment, the shades 36 preferably are constructed so that both of the front and back surfaces can scatter and reflect the light shone thereon. Thereby, the optical member is diagonally illuminated by both of light from the hot-cathode tubes 21 and light scattered and reflected by the shades 36. Consequently, the brightness of light radiated directly from the hot-cathode tubes 21 and light reflected by the shades 36 is equalized. Thereby, formation of lamp images due to light diagonally radiated to the optical member 22 can be suppressed.

On the other hand, light transmitted through the reflective layer 42 formed on the back side of each shade 36 and further through the base film 41 reaches the reflective layer 42 formed on the front side of the shade 36, and exits from the front surface of the shade 36 while being scattered and reflected by the reflective layer 42. Thereby, lamp images can be further minimized. The front surface of the shade 36 shines brightly due to the light exiting from the front side of the shade 36, so as to illuminate the optical member 22. Thereby, the front side of the shade 36 can be prevented from being darkened due to blocking of light from the hot-cathode tubes 21, even in the case that the reflectivity of the front surface of the shade 36 is low or in the case that light radiation to the front side of the shade 36 is ineffective due to the shape or the mounting location of the shade 36, for example. Further, the brightness can be uniformly distributed over the light source device 10.

If hot-cathode tubes 21 having a high luminescence intensity are used as light sources as in the present preferred embodiment, the lamp pitch can be set to be longer compared to the case in which cold-cathode tubes are used as light sources. According to this construction, the brightness is excessively high in the vicinity of each hot-cathode tube 21, while the areas between the hot-cathode tubes 21 are darkened due to insufficient brightness. This could result in difficulty in control for gradation formed through the entire optical member 22, and thereby the brightness may lack in uniformity.

In view of this, according to the present preferred embodiment, the shades 36 preferably have a diffuse transmittivity. According to this construction, each shade 36 as a whole can shine as a pseudo light source wider than the hot-cathode tube 21. Thereby, insufficient brightness in the areas between the hot-cathode tubes 21 can be prevented, and consequently the brightness is further uniformly distributed over the optical member 22.

The shades 36 are arranged so as to maintain a distance from the hot-cathode tubes 21, and therefore light radiated from the hot-cathode tubes 21 to the front side attenuates while traveling to the shades 36. Consequently, the shades 36 light with a lower intensity, compared to the construction in which the shades 36 are disposed in proximity to the hot-cathode tubes 21. Thereby, formation of lamp images can be further suppressed.

Moreover, the shades 36 preferably are white in color. Thereby, light reflected by the shades 36 can be prevented from being colored. This results in a backlight suitable for use in a liquid-crystal display device.

As described above, the shade 36 is preferably disposed between each hot-cathode tube 21 and the optical member 22. Therefore, light radiated from the hot-cathode tube 21 to the optical member 22 side is reflected by the hot-cathode tube 21 side surface of the shade 36, so as to illuminate the back-side reflective portion 34 side together with light radiated from the hot-cathode tube 21 to the opposite side of the optical member 22. Then, the light is reflected to the optical member 22 side by the back-side reflective portion 34, and thereafter reflected by the lateral-side reflective portions 35. Thereby, the light can reach the optical member 22 side around the shade 36 so as to illuminate the shade 36. Both of the front and back surfaces of the shade 36 can reflect light. Therefore, the optical member 22 side surface of the shade 36 reflects the light shone thereon, so as to be dimly illuminated. In this way, the shade 36 prevents intense light of the hot-cathode tube 21 from illuminating the optical member 22. Further, the optical member 22 side of the shade 36 functions as a pseudo light source due to its reflectivity. Thereby, formation of lamp images can be suppressed. This is particularly suitable for a case where hot-cathode tubes 21, each of which has a luminescent intensity higher than that of a cold-cathode tube conventionally used as a light source for this kind of light source device 10, are used as light sources.

Each of the shades 36 preferably is formed as a curved plate, so that its concavity is on the hot-cathode tube 21 side while its convexity is on the optical member 22 side. Therefore, compared to the case in which the shade 36 has a plate-like shape, light reflected by the optical member 22 side surface of the shade 36 can be diffused more widely while traveling to the optical member 22 side. This is effective for mitigation of lamp images.

Further, according to the above shape of the shade 36, light from the neighboring hot-cathode tubes 21 can illuminate the front surface of the shade 36. The shade 36 reflects the light from the plurality of neighboring hot-cathode tubes 21 so as to illuminate the optical member 22. Thereby, the brightness can be uniformly distributed over the light source device 10.

Further, the shades 36 have translucency. Therefore, light radiated from each hot-cathode tube 21 to the front side is partially transmitted through the shade 36, and exits from the front side of the shade 36. Thereby, the front side of the shade 36 can be prevented from being darkened due to blocking of light from the light sources, even in the case that the reflectivity of the optical member 22 side surface of the shade 36 is low or in the case that light radiation to the front side of the shade 36 is ineffective due to the shape or the mounting location of the shade 36, for example. Further, the brightness can be uniformly distributed over the light source device 10.

Moreover, the shades 36 can provide diffuse transmittivity, and therefore, each shade as a whole functions as a pseudo light source wider than the hot-cathode tube 21. Thereby, the brightness is further uniformly distributed over the optical member 22.

Further, both of the front and back surfaces of the shades 36 can scatter and reflect the light shone thereon. Thereby, the brightness of light radiated directly from the hot-cathode tubes 21 and light reflected by the shades 36 is equalized. Consequently, formation of lamp images due to light diagonally radiated to the optical member 22 can be suppressed.

In addition, the shades 36 are arranged so as to maintain a distance from the hot-cathode tubes 21, and therefore light radiated from the hot-cathode tubes 21 attenuates while traveling from the hot-cathode tubes 21 to the shades 36. Consequently, the shades 36 light with a lower intensity, compared to the construction in which the shades 36 are disposed in proximity to the hot-cathode tubes 21. Thereby, formation of lamp images can be further suppressed.

Figure 6:
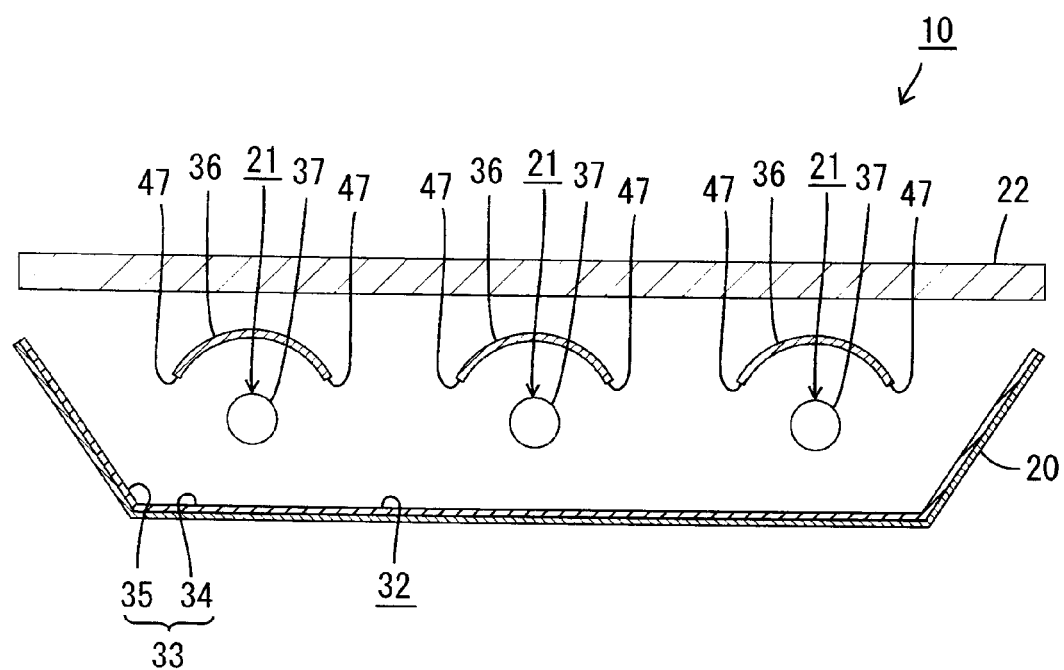
FIG. 6 is a schematic sectional view of the general construction of an optical member according to a second preferred embodiment of the present invention.

A second preferred embodiment of the present invention will be explained with reference to FIG. 6. In the present embodiment, the back-side edges 47 of each shades 36 are positioned nearer to the optical member 22 in relation to the front end of the hot-cathode tube 21. The other constructions are preferably substantially the same as the first preferred embodiment. Therefore, the same components are designated by the same symbols, and redundant explanation is omitted.

Next, the operation and effect of the present preferred embodiment will be explained. According to the preset preferred embodiment, the shades 36 are not present on the lateral sides of the hot-cathode tubes 21. Therefore, light radiated from each hot-cathode tube 21 to the lateral sides can illuminate the neighboring hot-cathode tubes 21. Thereby, the brightness can be uniformly distributed over the light source device 10.

Further, according to the above construction, light radiated to the front side can partially travel around the back-side edges 47 of the shades 36 and along the lateral sides of the shades 36 so as to directly illuminate the optical member 22. Thereby, lamp images may be formed on the optical member 22.

However, according to the present preferred embodiment, the light radiated from the hot-cathode tubes 21 directly to the optical member 22 attenuates while traveling from the hot-cathode tubes 21 to the optical member 22. Therefore, formation of lamp images can be suppressed.

Further, in the present preferred embodiment, both of the front and back surfaces of the shades 36 can scatter and reflect the light shone thereon. Therefore, the brightness of light radiated from the hot-cathode tubes 21 directly to the optical member 22 and light scattered and reflected by the shades 36 is equalized. Thereby, formation of lamp images due to light diagonally radiated to the optical member 22 can be suppressed.

Figure 7:
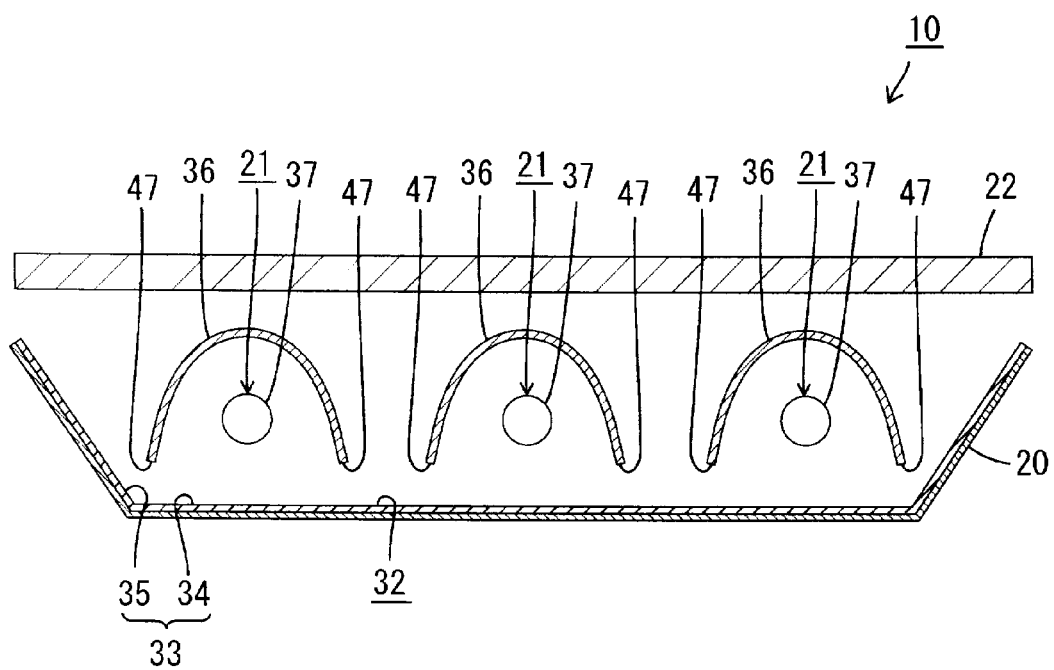
FIG. 7 is a schematic sectional view of the general construction of an optical member according to a third preferred embodiment of the present invention.

A third preferred embodiment of the present invention will be explained with reference to FIG. 7. In the present preferred embodiment, the back-side edges 47 of each shade 36 are positioned nearer to the back-side reflective portion 34 in relation to the back end of the hot-cathode tube 21. The other constructions preferably are substantially the same as the first preferred embodiment. Therefore, the same components are designated by the same symbols, and redundant explanation is omitted.

Next, the operation and effect of the present preferred embodiment will be explained. According to the present preferred embodiment, each shade 36 is disposed so as to cover the front side and lateral sides of the hot-cathode tube 21. Thereby, light radiated from the hot-cathode tubes 21 to the front side can be surely prevented from directly illuminating the optical member 22, and therefore formation of lamp images can be surely suppressed.

According to the above construction, light radiated from each hot-cathode tube 21 to the lateral sides is reflected by the shade 36, so as not to illuminate the neighboring hot-cathode tubes 21. Thereby, the distribution of brightness over the light source device may lack uniformity.

However, in the present preferred embodiment, the back-side edges 47 of each shade 36 are positioned nearer to the back-side reflective portion 34 in relation to the back end of the hot-cathode tube 21, and therefore light reflected by the back-side reflective portion 34 can be effectively reflected to the optical member 22 side. Thereby, the lack of uniformity in the distribution of brightness over the light source device can be suppressed.

Figure 8:
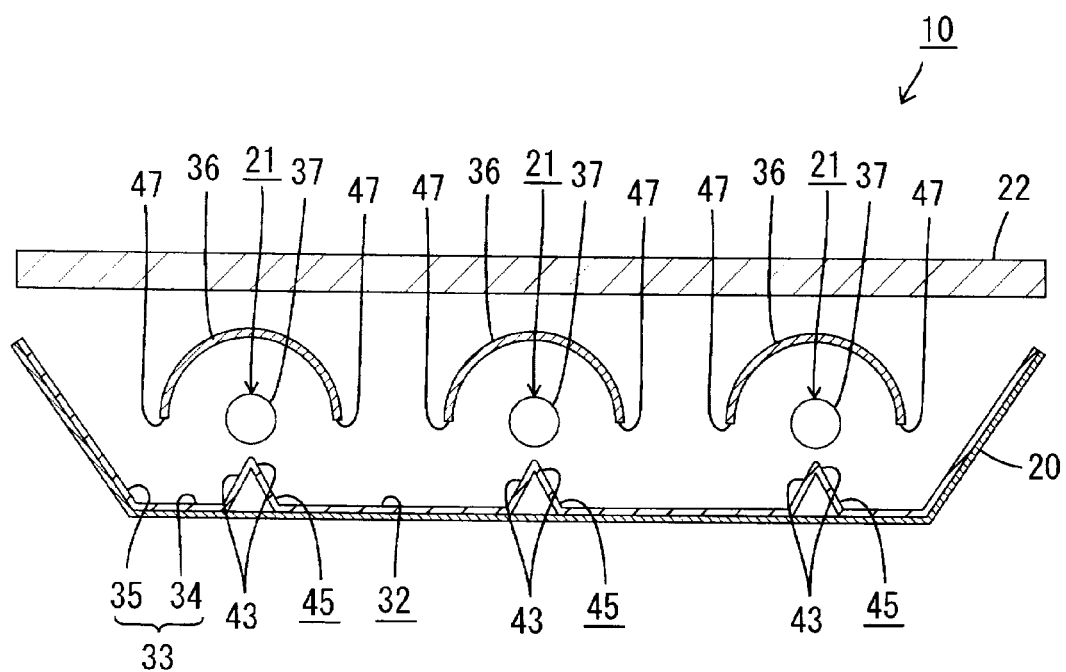
FIG. 8 is a schematic sectional view of the general construction of an optical member according to a fourth preferred embodiment of the present invention.

A fourth preferred embodiment of the present invention will be explained with reference to FIG. 8. In the present preferred embodiment, a plurality (e.g., preferably three in the figure) of first auxiliary reflective portions 45, each of which is positioned close to one of the hot-cathode tubes 21, are formed on the back-side reflective portion 34 so as to project to the front side and extend in the longitudinal direction of the hot-cathode tube 21. The cross section of each first auxiliary reflective portion 45 viewed from the longitudinal direction of the hot-cathode tube 21 preferably has a substantially angular shape, and that is formed by folding the back-side reflective portion 34 so as to form the substantially angular shape projecting to the front side. The ridge line of the first auxiliary reflective portion 45 is preferably substantially parallel to the axis of the tubular body 37 of the hot-cathode tube 21. Inclined surfaces 43 are arranged so as to slope down from the ridge line toward the right and left sides in FIG. 8. The other constructions are substantially the same as the first preferred embodiment. Therefore, the same components are designated by the same symbols, and redundant explanation is omitted.

Light radiated from each hot-cathode tube 21 to the first auxiliary reflective portion 45 is reflected to the lateral sides of the hot-cathode tube 21 by the inclined surfaces 43 of the first auxiliary reflective portion 45. The light reflected by the first auxiliary reflective portion 45 illuminates the neighboring hot-cathode tubes 21, and thereby the brightness can be uniformly distributed over the light source device 10. Further, the light reflected by the first auxiliary reflective portions 45 illuminates the lateral sides of the hot-cathode tubes 21, and thereafter is scattered and reflected by the lateral-side reflective portions 35 and the shades 36 so as to illuminate the optical member 22. Thereby, mitigation of lamp images can be achieved.

A fifth preferred embodiment of the present invention will be explained with reference to FIG. 9. In the present preferred embodiment, a plurality (e.g., preferably two in the figure) of second auxiliary reflective portions 46, each of which projects to the front side and extends in the longitudinal direction of the hot-cathode tube 21, are formed between the first auxiliary reflective portions 45 formed on the back-side reflective portion 34. The cross section of each second auxiliary reflective portion 46 viewed from the longitudinal direction of the hot-cathode tube 21 has a substantially angular shape, and that is formed by folding the back-side reflective portion 34 so as to define the angular shape projecting to the front side. The ridge line of the second auxiliary reflective portion 46 is preferably substantially parallel to the axis of the tubular body 37 of the hot-cathode tube 21. Inclined surfaces 43 are arranged so as to slope down from the ridge line toward the right and left sides in FIG. 9. The height of the second auxiliary reflective portion 46 projecting from the back-side reflective portion 34 to the front side is preferably larger than the height of the first auxiliary reflective portion 45 projecting from the back-side reflective portion 34 to the front side. The other constructions are preferably substantially the same as the fourth preferred embodiment. Therefore, the same components are designated by the same symbols, and redundant explanation is omitted.

Light radiated from each hot-cathode tube 21 to the first auxiliary reflective portion 45 is reflected to the lateral sides of the hot-cathode tube 21 by the inclined surfaces 43 of the first auxiliary reflective portion 45 so as to illuminate the second auxiliary reflective portion(s) 46. Then, the light is reflected to the front side by the inclined surfaces 43 of the second auxiliary reflective portions 46 so as to illuminate the optical member 22. The height of the second auxiliary reflective portion 46 projecting from the back-side reflective portion 34 to the front side is set to be larger than the height of the first auxiliary reflective portion 45 projecting from the back-side reflective portion 34 to the front side. Therefore, light can be effectively reflected to the front side. Thereby, the amount of light illuminating the front side is increased, and therefore the brightness of the optical member 22 is enhanced. Further, the light illuminating the second auxiliary reflective portions 46 is partially reflected to the lateral sides of the hot-cathode tubes 21 by the inclined surfaces 43 of the second auxiliary reflective portions 46, and thereafter scattered and reflected by the lateral-side reflective portions 35 and the shades 36 so as to illuminate the optical member 22. Thereby, lamp images can be minimized.

A sixth preferred embodiment of the present invention will be explained with reference to FIG. 10. In the present preferred embodiment, among the edges of each shade 36 substantially parallel to the longitudinal direction of the hot-cathode tube 21, the edge on the right side in FIG. 10 abuts on the front surface of the back-side reflective portion 34. Further, among the edges of the shade 36 substantially parallel to the longitudinal direction of the hot-cathode tube 21, the edge on the left side in the figure is positioned at a distance from the front surface of the back-side reflective portion 34 so that a gap 44 is formed therebetween. That is, each shade 36 is formed so as to slope down toward the right side of the back-side reflective portion 34 in FIG. 10. Each of the shade mounting grooves 40 formed on the lamp holders 38 has a shape capable of holding the shade 36 of the present preferred embodiment, not shown in detail. The other constructions are substantially the same as the first preferred embodiment. Therefore, the same components are designated by the same symbols, and redundant explanation is omitted.

Figure 10:
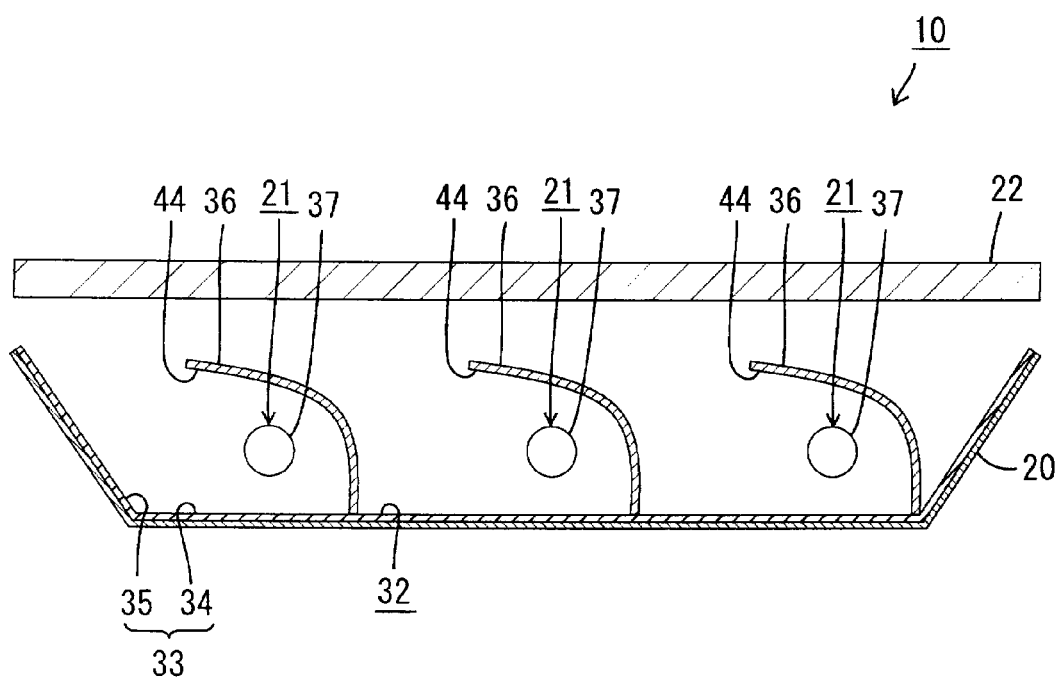
FIG. 10 is a schematic sectional view of the general construction of an optical member according to a sixth preferred embodiment of the present invention.

According to the present preferred embodiment, the light that is radiated from the hot-cathode tubes 21 and reflected by the back-side or lateral-side reflective portion 34, or the shades 36, can enter the back sides of the shades 36 through the gaps 44 formed between the left-side edges of the shades 36 in FIG. 10 and the back-side reflective portion 34. The incident light through each gap 44 is partially transmitted through the shade 36 so that the optical member 22 side of the shade 36 is illuminated. Thereby, the optical member 22 side of the shades 36 can be prevented from being darkened due to blocking of light from the light sources, and the brightness can be uniformly distributed over the light source device 10.

Figure 11:
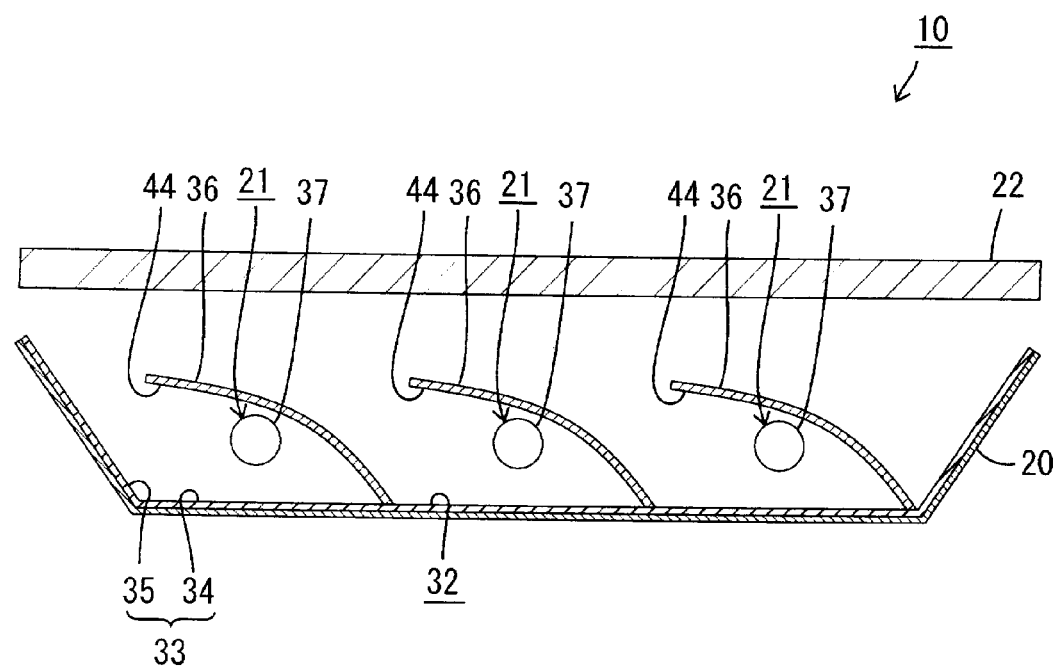
FIG. 11 is a schematic sectional view of the general construction of an optical member according to a seventh preferred embodiment of the present invention.

A seventh preferred embodiment of the present invention will be explained with reference to FIG. 11. In the present preferred embodiment, as shown in FIG. 11, each shade 36 slopes down toward the right side of the back-side reflective portion 34 in FIG. 11 more gradually, compared to the sixth preferred embodiment. Therefore, according to the present preferred embodiment, a larger area of the optical member 22 side surface of the shade 36 faces the optical member 22, compared to the sixth preferred embodiment. The other constructions are substantially the same as the sixth preferred embodiment. Therefore, the same components are designated by the same symbols, and redundant explanation is omitted.

According to the present preferred embodiment, the incident light through each gap 44 is partially transmitted through the shade 36 so that the optical member 22 side of the shade 36 lights. A larger area of the shade 36 faces the optical member 22 compared to the sixth preferred embodiment, and thereby the shade 36 functions as a pseudo light source larger than that of the sixth preferred embodiment. Consequently, lamp images can be further mitigated.

Further, each shade 36 slopes more gradually, and thereby light from the lateral sides of the shade 36 can be efficiently reflected to the optical member 22 side. Consequently, the brightness can be further uniformly distributed over the optical member 22.

The present invention is not limited to the preferred embodiments explained in the above description made with reference to the drawings. The following preferred embodiments may be included in the technical scope of the present invention, for example.

In the above-described preferred embodiments, one shade 36 is preferably provided for each hot-cathode tube 21. However, the present invention is not limited to this construction. One shade 36 may correspond to two or more hot-cathode tubes 21.

In the above preferred embodiments, each shade 36 preferably includes the reflective layers 42 on its respective sides. However, the present invention is not limited to this construction. A reflective layer 42 may be formed on one side of the shade 36. Further, the voids are formed in the reflective layers 42. However, the present invention is not limited to this construction. Voids may be formed in the base film 41.

In the above preferred embodiments, the front and back surfaces of each shade 36 are capable of performing scatter reflection. However, the present invention is not limited to this construction. The surfaces may be capable of performing specular reflection or other type of reflection.

In the above preferred embodiments, each shade 36 preferably has translucency. However, the present invention is not limited to this construction. A shade not having translucency may be used, and may be made of a metallic sheet having mirror surfaces on its front and back sides or a mirror, for example.

In the above preferred embodiments, each shade 36 preferably has diffuse transmittivity. However, in the case that the brightness is substantially uniformly distributed over the optical member because the lamp pitch is set to be short, for example, a shade not having diffuse transmittivity may be used.

In the above preferred embodiments, each shade 36 is preferably formed as a curved plate, so that its concavity is on the light source side while its convexity is on the optical member 22 side. However, the present invention is not limited to this construction. The shade 36 may have any shape that enables light to be reflected to the optical member 22 side, such as an angular shape, a tabular shape or a wavy shape, for example.

In the above preferred embodiments, shades 36 preferably are disposed at a distance from the hot-cathode tubes 21. However, the present invention is not limited to this construction. Shades 36 wider than the hot-cathode tubes 21 may be disposed so that each shade 36 contacts with the hot-cathode tube 21.

In the above preferred embodiments, the present invention is preferably applied to a liquid-crystal display 11. However, the present invention is not limited to this, but rather may be applied to any display device that includes a light source device 10 disposed on the back side of a display panel, such as an illuminated sign.

In the above preferred embodiments, the shades 36 preferably are white in color. However, in the case that light reflected by the shades 36 are allowed to be colored because the light source device is used as a backlight of an illuminated sign, for example, the shades 36 may be any kind of color.

In the above preferred embodiments, three hot-cathode tubes 21 preferably are provided, for example. However, the present invention is not limited to this construction. One hot-cathode tube, two hot-cathode tubes or four or more hot-cathode tubes 21 may be provided.

In the above preferred embodiments, the hot-cathode tubes 21 as bar-like light sources are preferably used. However, the present invention is not limited to this construction. Light sources may have any shape. For example, point light sources such as light bulbs, or circular light sources can be used as light sources.

Cold-cathode tubes may preferably be used as light sources, for example.

In the light source device 10 according to the fourth preferred embodiment, each of the first auxiliary reflective portions 45 on the back-side reflective portion 34 is preferably positioned close to one of the hot-cathode tubes 21. In the light source device 10 according to the fifth preferred embodiment, each of the first auxiliary reflective portions 45 on the back-side reflective portion 34 is positioned close to one of the hot-cathode tubes 21, while the second auxiliary reflective portions 46 on the back-side reflective portion 34 are positioned between the first auxiliary reflective portions 45. However, the present invention is not limited to this construction. The first and second auxiliary reflective portions 45, 46 can be positioned anywhere on the back-side reflective portion 34 so as to be able to diffuse light radiated from the light sources.

In the light source device 10 according to the fifth preferred embodiment, the height of each second auxiliary reflective portion 46 projecting from the back-side reflective portion 34 to the front side is preferably set to be larger than the height of each first auxiliary reflective portion 45 projecting from the back-side reflective portion 34 to the front side. However, the present invention is not limited to this construction. The height of each second auxiliary reflective portion 46 projecting from the back-side reflective portion 34 to the front side may be set to be equal to or smaller than the height of each first auxiliary reflective portion 45 projecting from the back-side reflective portion 34 to the front side. In this case, light radiated from each light source illuminates adjacent light sources without being reflected by the second auxiliary reflective portions 46, and thereby the brightness can be uniformly distributed over the light source device 10.

Figure 9:
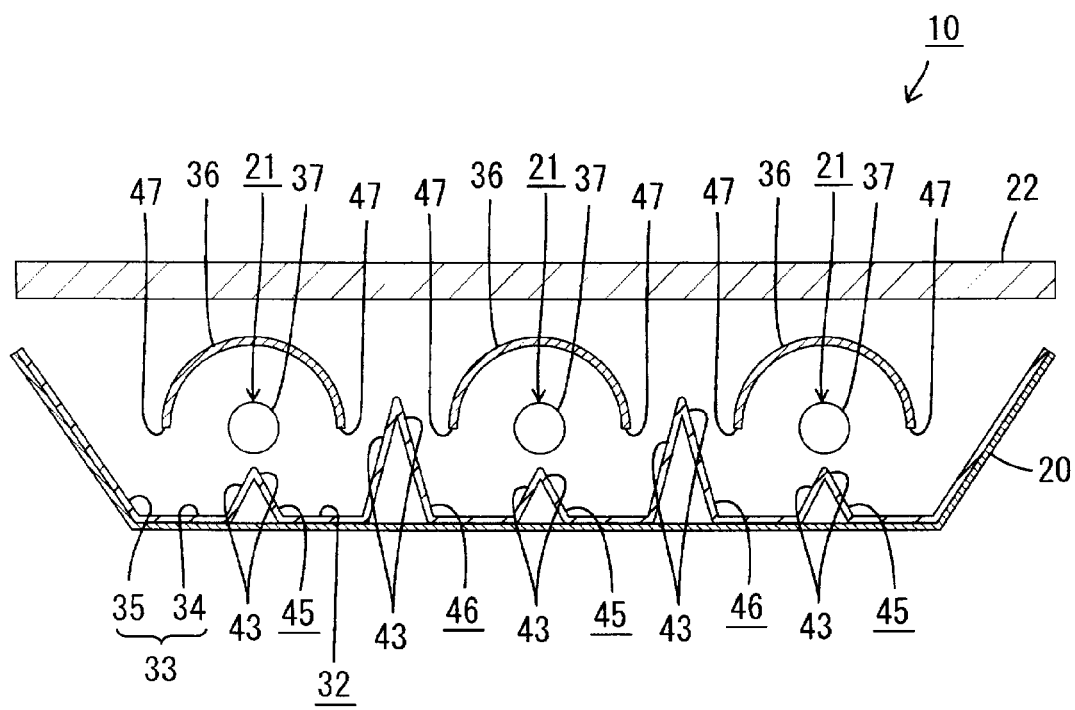
FIG. 9 is a schematic sectional view of the general construction of an optical member according to a fifth preferred embodiment of the present invention.

In the light source device 10 according to the sixth preferred embodiment, the gap 44 is preferably formed between the left-side edge of each shade 36 in FIG. 9 and the back-side reflective portion 34. However, the present invention is not limited to this construction. The gaps 44 of the shades 36 may be formed so that openings thereof face each other. According to this construction, the incident light from neighboring hot-cathode tubes 21 and through the gap 44 is partially transmitted through the shade 36, so that the optical member 22 side of the shade 36 lights. Thereby, the optical member 22 side of the shade 36 can be prevented from being darkened due to blocking of light from the light sources, and the brightness can be uniformly distributed over the light source device 10.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A light source device comprising:
a light source;
an optical member disposed opposite to said light source and arranged to transmit light;
a back-side reflective portion disposed on the opposite side of said light source from said optical member and arranged to reflect light to the optical member side;
a shade that is wider than said light source and arranged to reflect light from both of its front and back surfaces, said shade being disposed between said light source and said optical member and at a distance from said optical member; and
a lateral-side reflective portion disposed on a lateral side of said shade and arranged to reflect light from at least one said light source and said back-side reflective portion to the optical member side surface of said shade; wherein
said light source includes a plurality of elongated bar like light sources arranged sideways, and said shade has translucency, and one of its edges substantially parallel to the longitudinal direction of said light source abuts on said back-side reflective portion while a gap is defined between the other edge and said back-side reflective portion.

2. A light source device as in claim 1, wherein said shade includes a curved plate arranged so that a concave portion thereof is on the light source side while a convex portion is on the optical member side.

3. A light source device as in claim 2, wherein said shade has a property enabling diffuse transmission of light.

4. A light source device as in claim 3, wherein both of the front and back surfaces of said shade have a property enabling scatter reflection of light shone thereon.

5. A light source device as in claim 1, wherein said shade is disposed at a distance from said light source.

6. A light source device as in claim 5, wherein said shade is white in color.

7. A light source device as in claim 1, wherein an auxiliary reflective portion arranged to reflect light from said light source to a lateral side of said light source is provided on said back-side reflective portion.

8. A light source device as in claim 1, wherein a back-side edge of said shade is positioned nearer to the optical member in relation to a front end of the light source.

9. A light source device as in claim 1, wherein a back-side edge of said shade is positioned nearer to the back-side reflective portion in relation to a back end of the light source.

10. A light source device as in claim 7, wherein the auxiliary reflective portion is a first auxiliary reflective portion, the light source device further comprising a plurality of the first auxiliary reflective portions and a second auxiliary reflective portion provided on the back-side reflective portion and between the first auxiliary reflective portions.

11. A light source device as in claim 1, wherein at least one shade is provided for each light source.

12. A light source device as in claim 1, wherein voids are formed in the lateral-side reflective portion.

13. A light source device as in claim 1, wherein the lateral-side reflective portion is disposed on both lateral sides of said shade.

14. A light source device as in claim 1, wherein said light source is a cold-cathode tube.

15. A display device comprising:
a light source device; and
a display panel disposed on the front side of said light source device, wherein said light source device includes:
a light source;
an optical member disposed opposite to said light source and arranged to transmit light;
a back-side reflective portion disposed on the opposite side of said light source from said optical member and arranged to reflect light to the optical member side;
a shade that is wider than said light source and arranged to reflect light by both of the front and back surfaces thereof, said shade being disposed between said light source and said optical member and at a distance from said optical member; and
a lateral-side reflective portion disposed on a lateral side of said shade and arranged to reflect light from said light source or said back-side reflective portion to the optical member side surface of said shade; wherein
said light source includes a plurality of elongated bar like light sources arranged sideways, and said shade has translucency, and one of its edges substantially parallel to the longitudinal direction of said light source abuts on said back-side reflective portion while a gap is defined between the other edge and said back-side reflective portion.

16. The display device according to claim 15, wherein said display device is a liquid crystal display device and said panel is a liquid crystal panel.

17. A television receiver comprising:
a display device;
a television signal receiver; and
a display driving circuit arranged to drive said display device based on a signal from said television signal receiver; wherein
said display device includes a light source device and a liquid-crystal panel disposed on the front side of said light source device, said light source device including:
a light source;
an optical member disposed opposite to said light source and arranged to transmit light;
a back-side reflective portion disposed on the opposite side of said light source from said optical member and arranged to reflect light to the optical member side;
a shade wider than said light source and arranged to reflect light by both of the front and back surfaces thereof, said shade being disposed between said light source and said optical member and at a distance from said optical member; and
a lateral-side reflective portion disposed on a lateral side of said shade and arranged to reflect light from said light source or said back-side reflective portion to the optical member side surface of said shade; wherein
said light source includes a plurality of elongated bar like light sources arranged sideways, and said shade has translucency, and one of its edges substantially parallel to the longitudinal direction of said light source abuts on said back-side reflective portion while a gap is defined between the other edge and said back-side reflective portion.

18. A light source device as in claim 1, wherein the lateral side reflective portion includes an inclined surface continuously extending at an obtuse angle from the back-side reflective portion, the inclined surface having a height sufficient to reach a bottom surface of the optical member.

19. A display device as in claim 15, wherein the lateral side reflective portion includes an inclined surface continuously extending at an obtuse angle from the back-side reflective portion, the inclined surface having a height sufficient to reach a bottom surface of the optical member.

20. A television receiver as in claim 17, wherein the lateral side reflective portion includes an inclined surface continuously extending at an obtuse angle from the back-side reflective portion, the inclined surface having a height sufficient to reach a bottom surface of the optical member.

* * * * *